US007463806B2

(12) United States Patent  
Borrelli et al.

(10) Patent No.: US 7,463,806 B2  
(45) Date of Patent: Dec. 9, 2008

(54) METHODS OF GENERATING AND TRANSPORTING SHORT WAVELENGTH RADIATION AND APPARATI USED THEREIN

(75) Inventors: Nicholas F. Borrelli, Elmira, NY (US); John H. Bruning, Pittsford, NY (US); Douglas S. Goodman, Pittsford, NY (US); Karl W. Koch, III, Elmira, NY (US); Dirk Mueller, Lafayette, CO (US); Charlene M. Smith, Corning, NY (US); Alexander Streltsov, Chandler, AZ (US); James A. West, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 649 days.

(21) Appl. No.: 10/857,082

(22) Filed: May 27, 2004

(65) Prior Publication Data

US 2004/0258381 A1 Dec. 23, 2004

Related U.S. Application Data

(60) Provisional application No. 60/474,834, filed on May 28, 2003.

(51) Int. Cl.  
*G02B 6/032* (2006.01)
(52) U.S. Cl. .................. 385/125; 385/11; 385/115; 385/123; 385/126
(58) Field of Classification Search .............. 385/11, 385/115, 123, 125, 126  
See application file for complete search history.

(56) References Cited

U.S. PATENT DOCUMENTS 4,883,705 A 11/1989 Kawakami et al. .......... 428/209

| | | | |
|---|---|---|---|
| 5,070,045 A | 12/1991 | Comte et al. | ............ 501/4 |
| 5,616,159 A | 4/1997 | Araujo et al. | ........... 65/17.4 |
| 5,735,921 A | 4/1998 | Araujo et al. | ........... 65/32.1 |
| 6,205,818 B1 | 3/2001 | Seward, III | ........... 65/33.2 |

(Continued)

FOREIGN PATENT DOCUMENTS

FR 2686333 7/1993

(Continued)

OTHER PUBLICATIONS

Benabid F etal: "Stimulated Raman scattering in hydrogen-filled hollow-core photonic crystal fiber" Science American Assoc. Adv. Sci. USA, vol. 298, No. 5592, Oct. 11, 2002, pp. 399-402, XP002299506l ISSN: 036-8075 the whole document.

(Continued)

*Primary Examiner*—Brian Healy  
*Assistant Examiner*—Hung Lam  
(74) *Attorney, Agent, or Firm*—Timothy M. Schaeberle

(57) ABSTRACT

The present invention provides methods of generating short wavelength radiation, methods of transporting short wavelength radiation, and apparati used in these methods. One embodiment of the invention provides a method of transporting short wavelength radiation using a photonic band gap fiber. Another embodiment of the invention provides a method of transporting short wavelength radiation using a bundle of photonic band gap fibers. Another embodiment of the invention provides a method of generating ultraviolet radiation using high harmonic generation by pumping a noble gas-filled photonic band gap fiber with a pulsed laser source.

23 Claims, 9 Drawing Sheets

U.S. PATENT DOCUMENTS

| | | | |
|---|---|---|---|
| 6,403,508 B1 | 6/2002 | Araujo et al. | 501/54 |
| 6,444,133 B1 | 9/2002 | Fajardo et al. | 216/24 |
| 6,541,168 B2 | 4/2003 | Brown et al. | 430/5 |
| 2002/0043622 A1 | 4/2002 | Holger et al. | |
| 2002/0164137 A1* | 11/2002 | Johnson et al. | 385/125 |
| 2004/0013377 A1* | 1/2004 | Han | 385/125 |
| 2004/0263856 A1* | 12/2004 | Willig et al. | 356/460 |

FOREIGN PATENT DOCUMENTS

| | | |
|---|---|---|
| FR | 2732960 | 4/1995 |

OTHER PUBLICATIONS

U.S. Appl. No. 10/171,337, filed Dec. 18, 2003, Fajardo et al.
U.S. Appl. No. 10/298,374, filed May 20, 2004, Fekety et al.
U.S. Appl. No. 10/171,335, filed Dec. 18, 2003, Dawes et al.
U.S. Appl. No. 09/967,398, filed Apr. 11, 2002, Borrelli et al.
U.S. Appl. No. 10/326,200, filed Jun. 24, 2004, Brown et al.
"Block-Iterative frequency-domain methods for Maxwell's equations in a planewave basis", Johnson, S.J. and Joannopoulos, J.D., Optics Express, 8 (3), 173-190 (2001).
Durfee III et al., "Ultrabroad phase-matched optical parametric generation in the ultraviolet by use of guided waves" Opt. Lett., 22 (20), 1565 (1997).
Durfee III et al., "Phase-Matched Harmonics in Hollow Waveguides," Phys. Rev. Lett., 83 (11), 2187 (1999).
Misoguti et al., "Generation of Broadband VUV Light Using Third-Order Cascaded Processes," Phys. Rev. Lett., 87 (1), 013603-1 (2001).
Bartels et al., "Generation of Spatially Coherent Light at Extreme Ultraviolet Wavelengths," Science, 297, 376 (2002).

* cited by examiner

METHODS OF GENERATING AND TRANSPORTING SHORT WAVELENGTH RADIATION AND APPARATI USED THEREIN

CROSS-REFERENCE TO RELATED APPLICATIONS

This application claims priority under 35 U.S.C. § 119(e) to U.S. Provisional Patent Application Ser. No. 60/474,834, filed May 28, 2003 and entitled "METHODS OF GENERATING AND TRANSPORTING SHORT WAVELENGTH RADIATION AND APPARATI USED THEREIN", which is hereby incorporated herein by reference in its entirety.

BACKGROUND OF THE INVENTION

1. Field of the Invention

The present invention relates generally to short wavelength radiation, and more specifically to the generation and transportation of short wavelength radiation.

2. Technical Background

Short wavelength radiation finds wide application a diverse array of technologies. For example, the semiconductor industry uses ultraviolet radiation in photolithographic processes to define the conductive paths in integrated circuits. The lower limit of feature size is directly related to the wavelength of the radiation; hence, to form smaller features, it is desirable to use shorter wavelength radiation. Likewise, in metrology applications it is desirable to use radiation having as short a wavelength as possible to maximize resolution. Short wavelength radiation also finds use in medical and industrial applications.

While short wavelength radiation is extremely useful, there exist few workable methods to transmit it from one location (i.e. the source) to another (i.e. an instrument or a workpiece). Lenses and mirrors may be used to reflect and focus the radiation; such apparati are difficult to align, sensitive to vibrations, and may cause exposure of personnel to the radiation. Conventional optical fibers are generally not appropriate for transporting ultraviolet radiation (i.e. radiation with wavelength less than 400 nm), as their transmission of light with wavelengths less than about 370 nm is generally to be quite limited. For example, conventional germanium-doped silica waveguides tend to be photodarkened by 355 nm radiation. 248 nm radiation from an excimer source has reasonable transmission in conventional fibers (Ge-doped silica core/silica clad or silica core/F-doped silica clad) over only a very short distance (e.g. 0.5 m). Transmission of pulsed 248 nm radiation causes these fibers to develop color centers, further limiting their usefulness. Polymer waveguides are also unsuitable for transmission of ultraviolet radiation due to high loss and material damage. Short wavelength radiation is often used at high powers; conventional optical fibers are susceptible to damage or spurious effects in transmitting high power short wavelength radiation.

Hollow waveguides have been formed by coating the interior surface of 1 mm bore capillaries with reflecting layers of metal or metal/polymer. These have been used to transmit ultraviolet radiation down to 157 nm in wavelength with losses below 1 dB/m when straight; however, the losses increase to 2-4 dB/m when the waveguide is bent with a radius of 30 cm. Further, these hollow core waveguides are only slightly flexible, making routing short wavelength radiation around corners problematic. There exists a need for more efficient, safe, and flexible methods for transporting short wavelength radiation from one location to another.

In photolithography and metrology applications, it is desirable to use the shortest wavelength possible for which stability, spectral intensity, and beam quality requirements are satisfied. Currently, excimer lasers are widely used in these applications. Excimer lasers, while quite intense, suffer from relatively poor beam quality and are noisy with respect to intensity fluctuations. Further, excimer lasers are not easily tunable by an operator. Harmonic generation techniques have recently been identified as having the potential to deliver improved quality and to allow tunability of wavelength. However, current harmonic generation techniques tend to be quite low in output intensity. There remains a need for ultraviolet radiation sources having acceptable intensity, wavelength tunability over a wide range, and high beam quality.

SUMMARY OF THE INVENTION

One embodiment of the present invention relates to a method of transporting short wavelength radiation, the method comprising the steps of providing a photonic band gap fiber, the photonic band gap fiber comprising a core region and a photonic band gap structure surrounding the core region, the photonic band gap fiber having an input end and an output end; coupling the short wavelength radiation into the input end of the photonic band gap fiber; and coupling the short wavelength radiation out of the output end of the photonic band gap fiber.

Another embodiment of the present invention relates to a method of transporting short wavelength radiation, the method comprising the steps of providing a bundle including a plurality of photonic band gap fibers, each of the photonic band gap fibers comprising a core region and a photonic band gap structure surrounding the core region, each of the photonic band gap fibers having an input end and an output end; coupling the short wavelength radiation into the input ends of the photonic band gap fibers; and receiving the short wavelength radiation out of the output ends of the photonic band gap fibers.

Another embodiment of the present invention relates to a method of generating ultraviolet radiation, the method comprising the steps of providing a photonic band gap fiber having a hollow core region and a photonic band gap structure surrounding the hollow core region, the hollow core region including a gas at a pressure; and coupling pulsed coherent pump radiation into the hollow core of the photonic band gap fiber, the photonic band gap fiber being adapted to guide the pump radiation.

Another embodiment of the present invention relates to an apparatus for generating ultraviolet radiation, the apparatus comprising a pressure chamber having at least one window, the window being at least partially transparent to the ultraviolet radiation; a photonic band gap fiber having a hollow core region, a photonic band gap structure surrounding the hollow core region, an input end and an output end, the photonic band gap fiber being inside the pressure chamber, the input end and the output end of the photonic band gap fiber being operatively coupled to one of the at least one windows.

The devices and methods of the present invention result in a number of advantages over prior art devices and methods. For example, the present invention provides a method suitable for transporting ultraviolet radiation along a tortuous path from an ultraviolet source to an apparatus or a workpiece. The present invention also provides a method suitable for transporting high-power short wavelength radiation from a source to a workpiece. The methods of the present invention may be used to output ultraviolet radiation having a desired shape, wavelength content, pulse width, and degree of incoherence. The present invention also allows for the generation of tunable, high quality ultraviolet radiation with higher intensity than previously possible.

Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings are not necessarily to scale, and sizes of various elements may be distorted for clarity. The drawings illustrate one or more embodiment(s) of the invention, and together with the description serve to explain the principles and operation of the invention.

DETAILED DESCRIPTION OF THE PREFERRED EMBODIMENTS

The present invention relates generally to the use of photonic band gap fibers in the transportation and generation of short wavelength radiation. Photonic band gap fibers guide light by a mechanism that is fundamentally different from the total internal reflection mechanism typically used in conventional optical fibers. Photonic band gap fibers have a photonic band gap structure formed in the cladding of the fiber. The photonic band gap structure may be, for example, a periodic array of holes having a spacing on the order of the wavelength of light. The photonic band gap structure has ranges of frequencies and propagation constants, known as band gaps, for which light is forbidden from propagating in the photonic band gap structure. The core region of the fiber is formed by a defect in the photonic band gap structure cladding. For example, the defect may be a hole of a substantially different size and/or shape than the holes of the photonic band gap structure. Alternatively, the defect may be a solid structure embedded within the photonic band gap structure. Light introduced into the core will have a propagation constant determined by the frequency of the light and the structure of the core. Light propagating in the core of the fiber having a frequency and propagation constant within a band gap of the photonic band gap structure will not propagate in the photonic band gap cladding, and will therefore be confined to the core. A photonic band gap fiber may have a core region that is formed from a hole larger than those of the surrounding photonic band gap structure; such a core region is said to be a hollow core region. In such a hollow-core fiber, the light may be guided substantially within the hollow core region.

Figure 1:
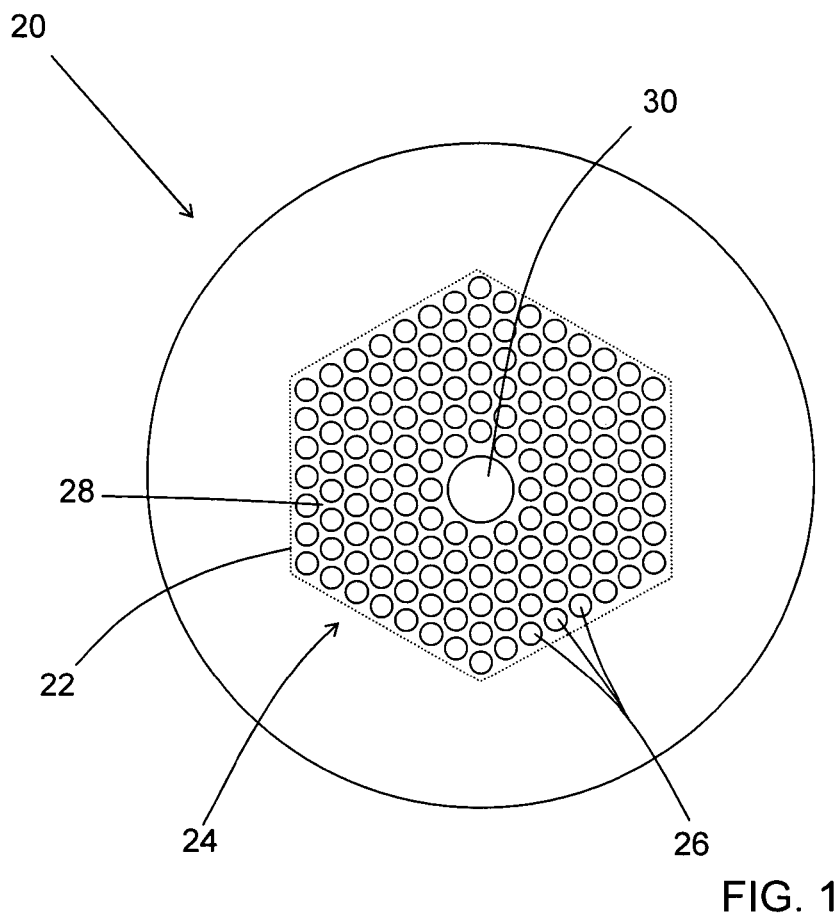
FIG. 1 is a cross-sectional schematic view of a photonic band gap fiber of the present invention.

FIG. 1 is a cross-sectional schematic view of a photonic band gap fiber 20 suitable for use in the present invention. Photonic band gap fiber 20 includes a photonic band gap structure 24. In the Example of FIG. 1, the photonic band gap structure 24 includes a periodic array of holes 26 formed in a matrix material 28. Holes 26 of FIG. 1 are schematically depicted as being circular in cross-section; the skilled artisan will recognize that the holes may have a substantially different cross-sectional shape (e.g. square, triangular, hexagonal). Photonic band gap fiber 20 also includes core region 30, which is surrounded by photonic band gap structure 24 of cladding region 22. In the example of FIG. 1, core region 30 is formed as a hole in matrix material 28. The hole defining core region 30 is much larger than the holes 26 of photonic band gap structure; as such, core region 30 acts as a defect in photonic band gap structure 24. Core region 30 may be filled with an inert gas such as nitrogen or argon, air, or a liquid. Core region 30 may also be a region of substantial vacuum (e.g., less than about 20 mm Hg).

Photonic band gap fibers desirable for use in the present invention guide radiation substantially within the core region. Radiation introduced into the core region will have a propagation constant determined by the frequency of the radiation and the structure of the core. Radiation propagating in the core of the fiber having a frequency and propagation constant within a band gap of the photonic band gap structure will not propagate in the photonic band gap structure, and will therefore be substantially confined to the core. As such, the photonic band gap structure acts as a cladding for the core region. The photonic band gap fibers desirable for use in the present invention guide radiation having a frequency within a band gap of the photonic gap structure substantially within the core region.

Unlike in conventional optical fibers, the guidance of radiation in photonic band gap fibers does not rely on the refractive index of the core being higher than the refractive index of the cladding. As such, the core region may have a lower effective refractive index than that of the cladding region at the wavelength of the optical energy. As used herein, the effective refractive index of a region is defined as $$n_{eff} = \sqrt{\sum_{i=1}^{z} f_i \cdot n_i^2}$$

where $n_{eff}$ is the effective refractive index, z is the total number of different refractive indices $n_i$ in the photonic band gap structure, and $f_i$ is the volume fraction for refractive index $n_i$. For example, in the photonic band gap fiber depicted in FIG. 1, if core region 30 is filled with a gas or a vacuum, it will have a refractive index of about 1 at near ultraviolet wavelengths. The effective refractive index of cladding region 22 will be higher than that of core region 30 due to the presence of matrix material 28.

Figure 2:
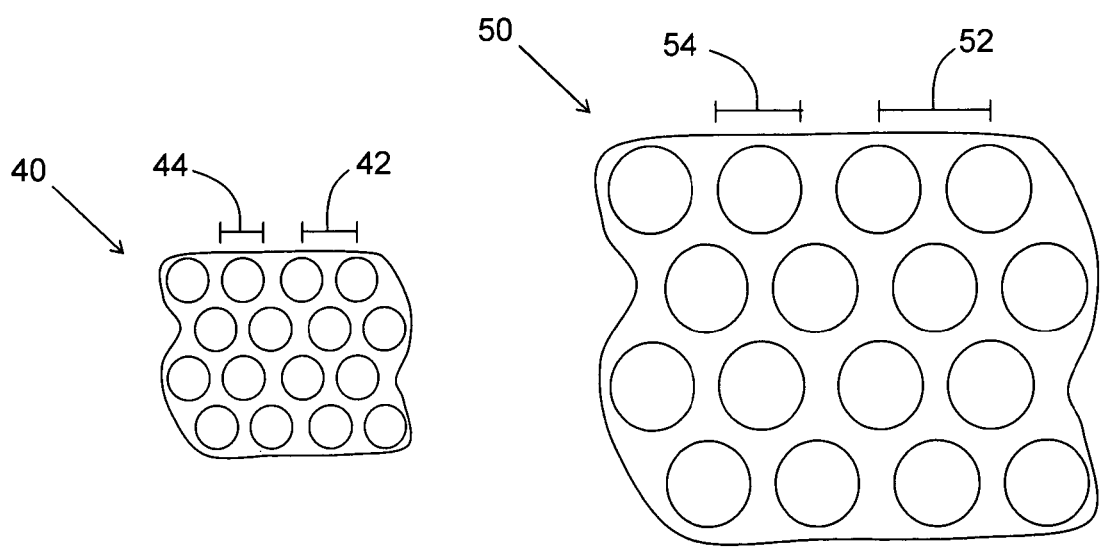
FIG. 2 is a cross-sectional schematic view of two photonic band gap structures having different pitches and hole sizes.

As the skilled artisan will appreciate, the exact frequencies spanned by the band gaps of the photonic band gap structure depend strongly on its structural details. The skilled artisan may adjust the band gap by judicious design of the photonic band gap structure. Computational methodologies familiar to the skilled artisan may be advantageously used in the design of the photonic band gap structure. A free software package for the calculation of photonic band gap structures is available from the Massachusetts Institute of Technology (*The MIT Photonic-Bands Package*, Internet Uniform Resource Locator http://ab-initio.mit.edu/mpb/). Dielectric structures having a desired shape and refractive index profile may be defined geometrically. The frequencies and electric and magnetic fields of electromagnetic modes in a given dielectric structure is calculated by computer solution of the Maxwell equations. A trial solution is constructed by expressing the magnetic field as a sum of plane waves, with arbitrary (random number) coefficients. The Maxwell equations are solved by varying the plane wave coefficients until the electromagnetic energy is minimized. This is facilitated by a preconditioned conjugate gradient minimization algorithm. The mode frequencies, electric fields, and intensity distributions for each mode are thereby computed. This computational technique is described in more detail in "Block-Iterative frequency-domain methods for Maxwell's equations in a planewave basis", Johnson, S. J. and Joannopoulos, J. D., *Optics Express*, 8(3), 173-190 (2001). The skilled artisan will appreciate that the wavelength range of the band gap scales with the size of the photonic band gap structure. For example, as shown in FIG. 2, if a triangular array of holes 40 has a pitch 42 of about 4.7 µm, a hole size 44 of about 4.6 µm, and a band gap ranging in wavelength from about 1400 nm to about 1800 nm, then a scaled triangular array of holes 50 having a pitch 52 of about 9.4 µm, a hole size 44 of about 9.2 µm will have a band gap ranging in wavelength from about 2800 nm to about 3600 nm.

Figure 3:
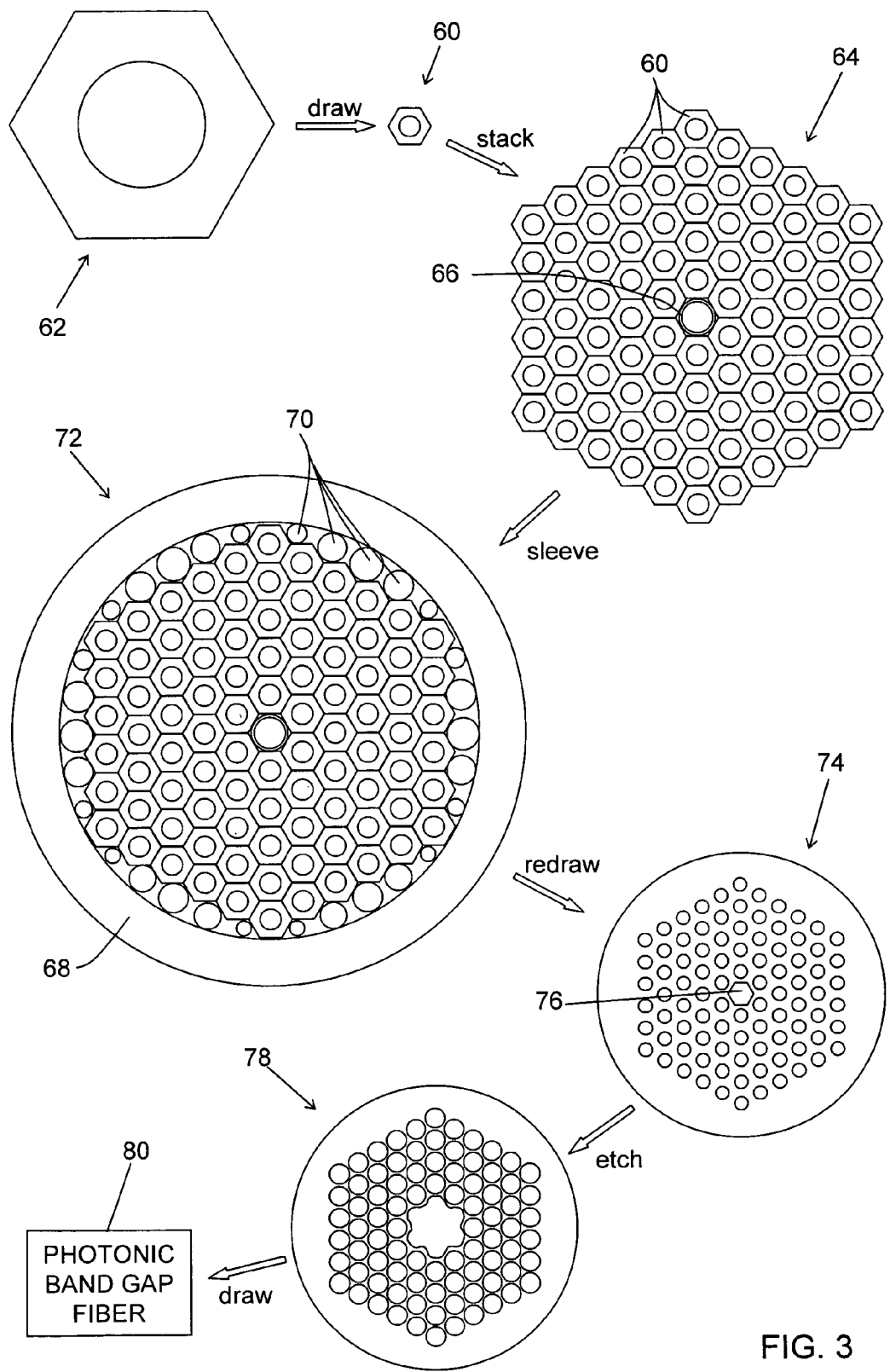
FIG. 3 is a cross-sectional schematic view of a method of fabricating the photonic band gap fibers of the present invention.

The photonic band gap fibers used in the present invention may be fabricated using methods analogous to those used in fabricating conventional optical fibers. A preform having the desired arrangement of core and cladding features is formed, then drawn into fiber using heat and tension. A suitable method for making a photonic band gap fiber is shown in cross-sectional detail in FIG. 3. Hollow hexagonal capillaries 60 are made by drawing a hexagonal-sided glass tube 62 using heat and tension. These capillaries are stacked together to form an assembly 64 having a periodic lattice structure. One or more capillaries 60 are removed at the center of assembly 64; in order to make a hollow-core fiber, a thin tube 66 may optionally be inserted into the hole formed by the removal of the central capillary as shown in FIG. 3. In order to make a solid core fiber, a solid hexagonal rod may be inserted into the hole. Stacked assembly 64 is positioned inside a sleeve tube 68, using solid rods 70 to hold the assembly in place. Sleeved assembly 72 is redrawn using heat and tension to reduce its size, forming a substantially monolithic body 74. It may be desirable to pull a vacuum on the spaces between the stacked capillaries during the redraw step in order to close any interstitial voids between the external surfaces of the capillaries. Body 74 is then etched with $NH_4F.HF$ to increase the sizes of the holes of the periodic array as well as of the hole of the core region. Redraw and etching procedures are described, for example, in U.S. Pat. No. 6,444,133, the specification of which is hereby incorporated herein by reference in its entirety. In the etching step, the walls separating the hole 76 of the core region from the innermost course of holes of the photonic band gap structure are removed, greatly enlarging the size of the hole of the core region. Redrawn, etched body 78 is drawn into a photonic band gap fiber 80 using methods familiar to the skilled artisan. Before being drawn into fiber, redrawn etched body 76 may be sleeved with an overclad tube (not shown) to provide a fiber with a larger outer diameter. Photonic band gap fiber 80 may be coated with a primary and secondary optical fiber coating, as is common in the optical fiber art.

It may be desirable to form the preform so that the material of an inner portion of the preform has a higher softening point than the material of an outer portion of the preform, as is described in commonly owned U.S. patent application Ser. No. 10/171,337, filed on Jun. 12, 2002 and entitled "MICROSTRUCTURED OPTICAL FIBERS AND METHODS AND PREFORMS FOR FABRICATING MICROSTRUCTURED OPTICAL FIBERS", the specification of which is hereby incorporated herein by reference in its entirety. For example, the difference in softening points may be about 50° C. or greater, about 100° C. or greater, or even about 150° C. or greater. One way to achieve such a difference is to use silica glass for the capillaries, and a doped silica tube (e.g. germanium doped, fluorine doped, boron doped) as the sleeve tube. Alternatively, glasses with different concentrations of a common dopant can be used in the inner portion and the outer portion of the preform. In cases where a specially-shaped core structure is used, it may be desirable to form the core structure from a material with an even higher softening point (e.g. tantalum-doped silica). Such a difference in softening point allows the inner portion of the preform to be at a somewhat higher viscosity during the draw, leading to less distortion of the inner portion of the structure.

In order to reduce the occurrence of breaks during the draw and lower the level of attenuation in the drawn fiber, it may be desirable to provide a preform having reduced levels of contaminants (e.g. particulate contaminants, organic contaminants, inorganic contaminants) as well as reduced levels of OH content (i.e. surface-adsorbed water). As such, it may be desirable to clean the preform at various stages of manufacture with a chlorine-containing gas (e.g. a mixture of chlorine and helium). As the skilled artisan will recognize, chlorine gas is effective at removing many types of contaminants. For example, chlorine gas may react with water (e.g. in the form of surface OH) and many inorganic contaminants to form volatile species that are removed in a subsequent purge cycle. Chlorine may also act to oxidize various organic species. It may also be desirable to include exposure to oxygen in a cleaning regimen in order to more fully remove organic contaminants. Cleaning process are described in detail in commonly owned U.S. patent application Ser. No. 10/298,374, filed on Nov. 18, 2002 and entitled "METHODS FOR MANUFACTURING MICROSTRUCTURED OPTICAL FIBERS WITH CONTROLLED CORE SIZE", the specification of which is hereby incorporated herein by reference in its entirety.

The preforms used in making the optical fiber of the present invention may be made using other methods familiar to the skilled artisan. For example, redraw techniques may be used to reduce the preform diameter. Etching with $SF_6$, $NF_3$ or aqueous $NH_4F \cdot HF$ may be used to enlarge the size of the holes. Redraw and etching procedures are described, for example, in U.S. Pat. No. 6,444,133, the specification of which is hereby incorporated herein by reference in its entirety.

The preform may be drawn into microstructured optical fiber using methods familiar to the skilled artisan. Additionally, a pressure may be placed on the holes of the preform during the draw in order to keep them from closing due to surface tension. Alternatively, on the end of the preform opposite the drawn end, the holes may be closed in order to maintain a positive pressure inside the holes of the preform, thereby preventing them from closing due to surface tension. It may be desirable to place different pressures on different sets of holes of the preform, as is described in commonly owned U.S. patent application Ser. No. 10/171,335, filed Jun. 12, 2002 and entitled "METHODS AND PREFORMS FOR DRAWING MICROSTRUCTURED OPTICAL FIBERS", the specification of which is hereby incorporated herein by reference in its entirety. For example, the large core hole of a photonic band gap fiber may be coupled to a first pressure system, and the holes of the photonic crystal structure may be coupled to a second pressure system. The first pressure system may be set to a lower pressure than the second pressure system so that the inner core hole does not expand relative to the holes of the photonic crystal structure.

Figure 4:
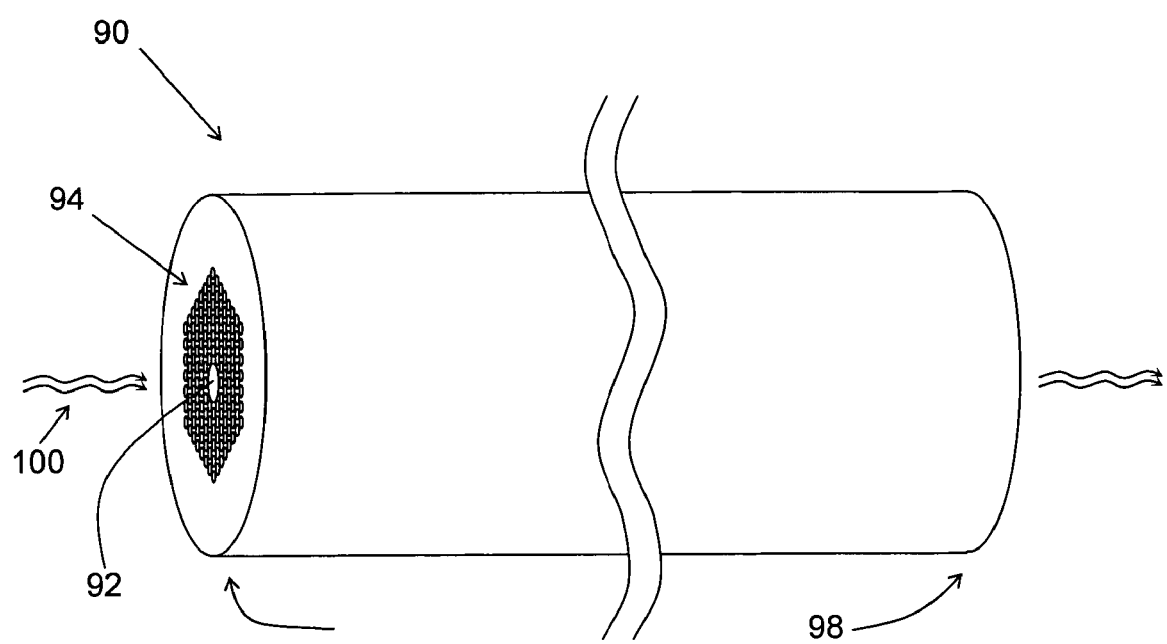
FIG. 4 is a schematic view of a method of transporting short wavelength radiation according an embodiment to the present invention.

One embodiment of the invention provides a method for transporting short wavelength radiation. As used herein, short wavelength radiation is radiation having a wavelength less than 600 nm. The method is demonstrated in schematic view in FIG. 4. A photonic band gap fiber 90 is provided. The photonic band gap fiber includes a core region 92, and a photonic band gap structure 94 surrounding core region 92, and has an input end 96 and an output end 98. Short wavelength radiation 100 is coupled into input end 96 of photonic band gap fiber 90, transmitted through photonic band gap fiber 90, and coupled out of output end 98 of photonic band gap fiber 90. In desirable embodiments of the invention, the short wavelength radiation is ultraviolet radiation having a wavelength less than 400 nm. The short wavelength radiation may have a wavelength of, for example, about 532 nm, such as that generated by Nd:YAG and Nd:YVO$_4$ lasers; about 355 nm or about 266 nm, such as that generated by a Q-switched Nd:YAG laser; about 351 nm, such as that generated by an argon ion laser; about 248 nm, such as that generated by an KrF excimer laser; about 244 nm, such as that generated by a frequency-doubled Ar ion laser; about 193 nm, such as that generated by a ArF excimer laser; or about 157 nm, such as that generated by an $F_2$ excimer laser. The methods of the present invention are especially desirable for use in transporting ultraviolet radiation having a wavelength less than about 300 nm. The methods of the present invention are also desirable for use in transporting short wavelength radiation having an average power greater than about 800 mW. The methods of the present invention are especially desirable for use in transporting short wavelength radiation having an average power greater than about 2 W. The methods of the present invention may be advantageously used to transport pulsed short wavelength radiation having high peak powers (e.g. greater than 1 kW, or even greater than 1 MW).

In desirable embodiments of the present invention, the photonic band gap fiber has a hollow core region. In order to minimize the interaction of the short wavelength radiation with the solid material of the fiber, it is desirable for the short wavelength radiation to be guided substantially within the hollow core region of the photonic band gap fiber. For example, in certain embodiments of the invention, 90% of the modal energy is contained within the hollow core region.

Figure 5:
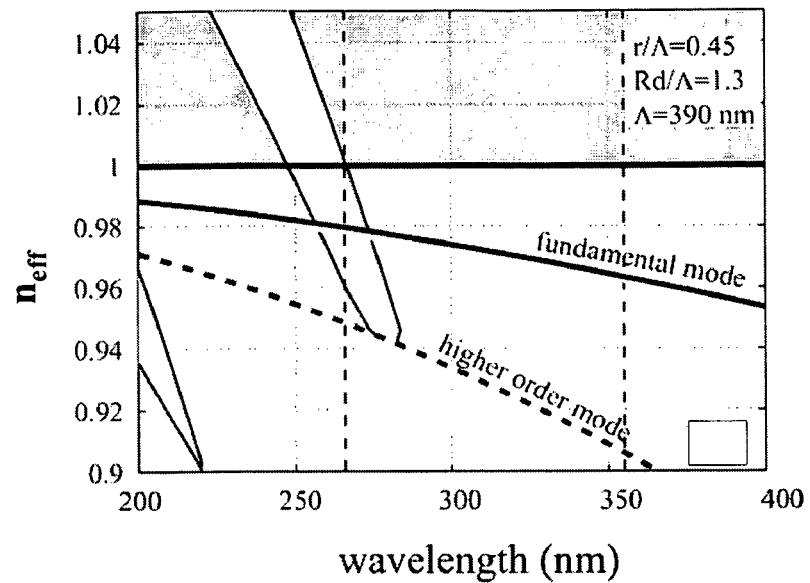
FIGS. 5 and 6 are band gap diagrams for examples of photonic band gap fibers of the present invention.

The photonic band gap structures of the photonic band gap fibers used in the present invention may have more than one band gap. An example of a theoretical band gap diagram for a photonic band gap structure is shown in FIG. 5. The photonic band gap structure for this diagram has a triangular geometry (such as that shown in FIG. 1) of round air holes in a silica matrix. The ratio of the radius r of the holes to the pitch Λ (i.e. center-to-center spacing of the holes) is 0.45. The core region is an air hole having a radius Rd of 1.3Λ. The pitch Λ is 390 nm. The band gap diagram has wavelength as its ordinate, and effective modal refractive index $n_{eff}$ as its abscissa. Shaded regions indicate band gaps of the photonic band gap structure. A thick line indicates the fundamental mode of the core, while a thick dashed line indicates a higher-order mode of the core. Short wavelength radiation may be guided within the hollow core for combinations of wavelength and $n_{eff}$ that lie upon a mode of the core within a band gap of the photonic band gap structure. For example, the band gap diagram of FIG. 5 indicates that ultraviolet radiation having wavelengths between about 257 nm and about 272 nm may be guided in the fundamental mode of the core. As such, the photonic band gap fiber described by the band gap diagram of FIG. 5 is well-suited for guiding ultraviolet radiation having a wavelength of 266 nm. Since wavelength scales with pitch, as described above with reference to FIG. 2, the skilled artisan will understand that the pitch may be changed from 390 nm to yield guidance of a desired wavelength. In certain desirable embodiments of the invention, the short wavelength radiation is guided in the core region by a fundamental band gap (i.e. lowest frequency, and therefore highest wavelength, band gap) of the photonic band gap structure. Fundamental band gaps tend to have broad spectra, support single-mode operation, and are believed to have desirable attenuation characteristics.

Figure 6:
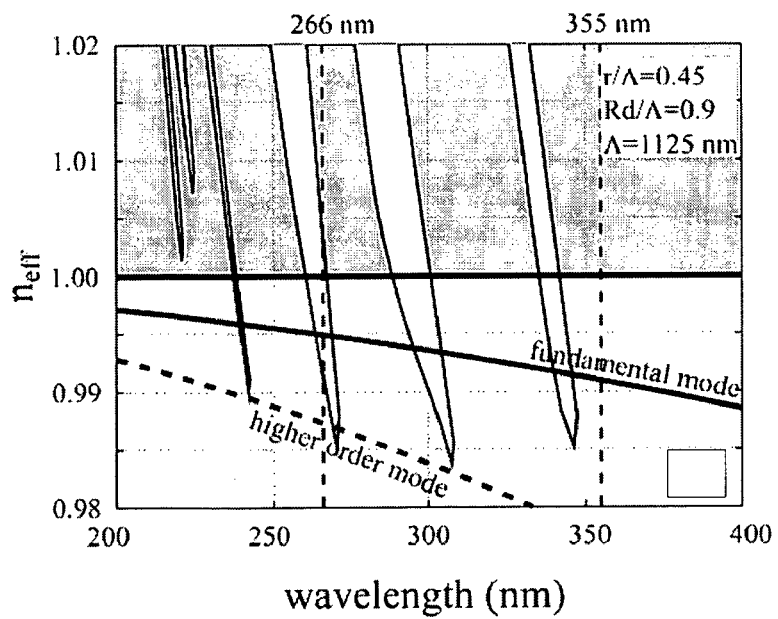

In certain embodiments of the invention, it may be desirable to use a photonic band gap fiber in which the short wavelength radiation is guided in the core region by a higher-order band gap of the photonic band gap structure. Higher-order band gaps tend to have narrow frequency ranges than fundamental band gaps; however, for transmission of substantially single-wavelength radiation, this may not be of prime concern. Higher-order band gaps appear at higher frequencies than does the fundamental band gap. As such, the use of a higher-order band gap allows the pitch of the fiber to be larger for a given wavelength of short wavelength radiation, simplifying construction and alignment of the photonic band gap fiber. FIG. 6 is a band gap diagram illustrating guidance in a higher-order band gap. In the photonic band gap fiber described by FIG. 6, the ratio of r/Λ is 0.45; the ratio of Rd/Λ is 0.9, and Λ is 1125 nm. In this photonic band gap fiber, short wavelength radiation having a wavelength of about 345 nm may be guided in the one higher-order band gap, while short wavelength radiation having a wavelength of 266 nm may be guided in a still higher-order band gap. The fundamental band gap is not shown on the diagram of FIG. 6

In order to provide photonic band gap fibers with the most favorable properties, it may be desirable for the photonic band gap structures of the photonic band gap fibers used in the present invention to have a large void filling fraction. For example, it is desirable for greater than about 60% of the volume of the photonic band gap structure to be filled with a gas or a vacuum. More desirably, greater than 70% of the volume of the photonic band gap structure is filled with a gas or a vacuum. In certain desirable embodiments of the invention, greater than 80% of the volume of the photonic band gap structure is filled with a gas or vacuum.

Figure 7:
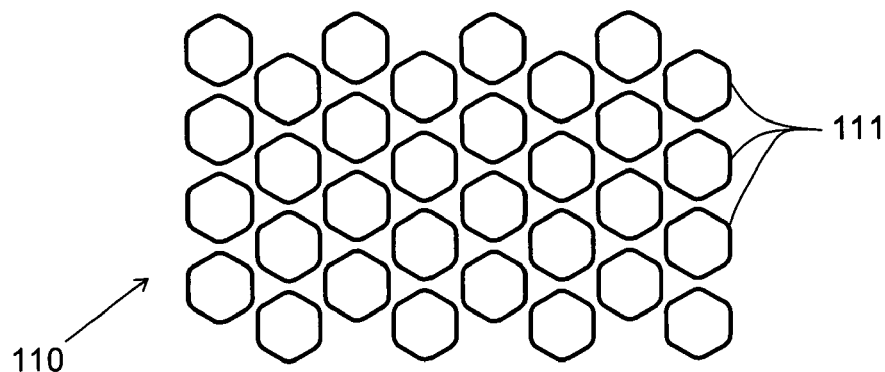
FIG. 7 is a schematic view of a desirable photonic band gap structure according to one embodiment of the present invention.
Figure 8:
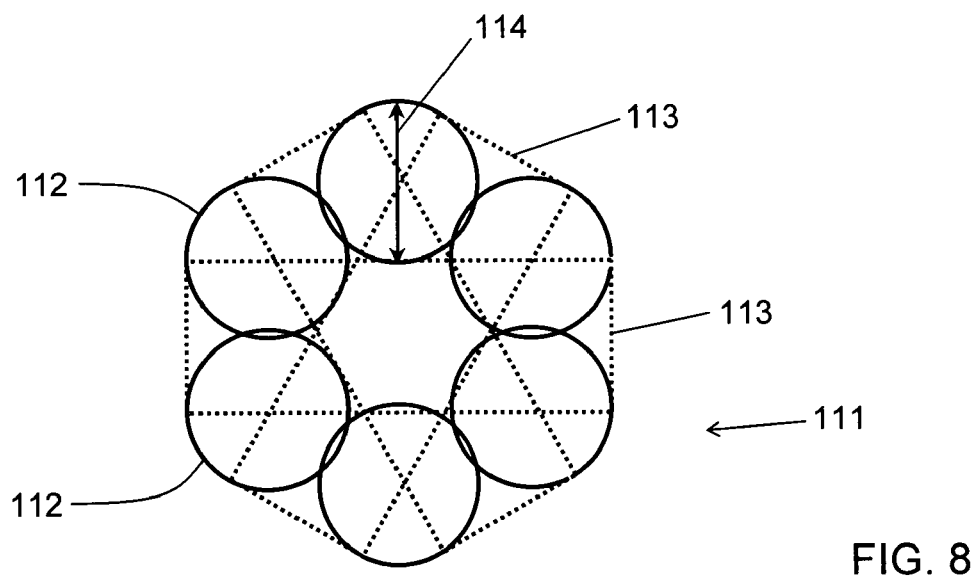
FIG. 8 is a schematic view of the radius of curvature of a rounded hexagonal hole.

Higher order band gaps tend to be narrower than lower order band gaps. In order to provide a photonic band gap fiber with robust guiding characteristics and lower sensitivity to manufacturing variance, a higher order band gap with an increased width is desirable. One especially desirable photonic band gap structure is shown schematically in FIG. 7. Photonic band gap structure 110 is formed from rounded hexagonal holes 111 arranged in a triangular lattice. Holes 111 are not true hexagons, because at least some rounding typically occurs in the fabrication process. Rounded hexagonal holes can be mathematically modeled as the combination of six circles 112 and three rectangles 113, as shown in FIG. 8. The diameter of curvature of the hexagon is the diameter 114 of circles 112, and can range from $0 \cdot \Lambda$ (the trivial case of a perfect non-rounded hexagon) to approaching $1 \cdot \Lambda$ (a perfect circle), where $\Lambda$ is the pitch of the triangular lattice. Desirably, the diameters of curvature of the rounded hexagonal holes 111 are less than about $0.5 \cdot \Lambda$. More desirably, the diameters of curvature of the rounded hexagonal holes are less than about $0.25 \cdot \Lambda$. The inventors have determined that photonic band gap structures formed from rounded hexagons with smaller diameters of curvature tend to have relatively broad higher order band gaps.

Figure 9:
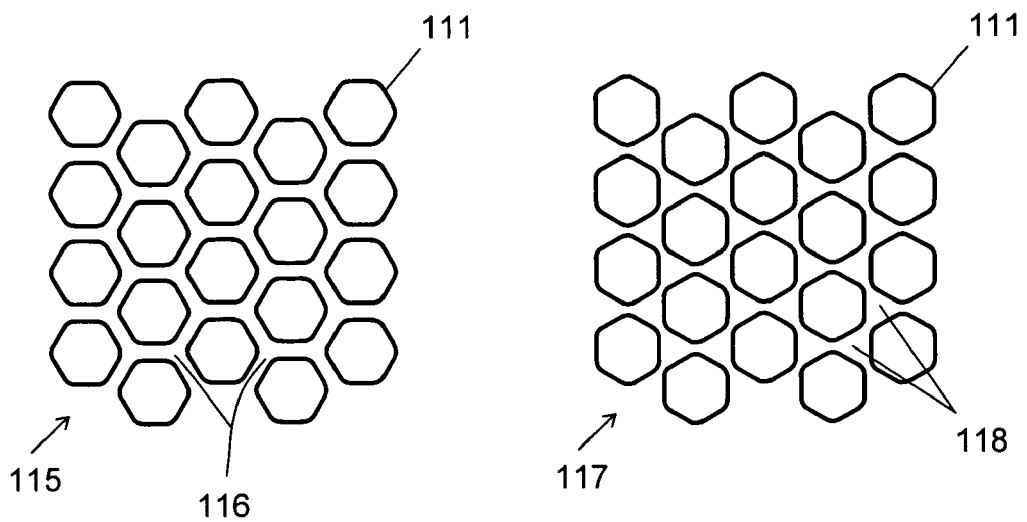
FIG. 9 is a schematic view of a desirable photonic band gap structure according to one embodiment of the present invention.

The orientation of the rounded hexagonal holes in the triangular lattice also has an effect on the breadths of the higher order band gaps. FIG. 9 shows two possible photonic band gap structures formed from rounded hexagons in a triangular lattice. In photonic band gap structure 115, rounded hexagonal holes 111 are oriented at an angle of about 0° to the triangular lattice. In this structure, the glass matrix is formed as "lines" 116 of glass relatively consistent thickness. In an alternative, more desirable photonic band gap structure 117, rounded hexagons 111 are oriented at an angle of about 30° to the triangular lattice. In this more desirable structure, the glass matrix is formed as triangular "islands" 118 of glass, joined at their apices. In desirable embodiments of the invention, the rounded hexagonal holes are oriented at an angle of at least about 20° to the triangular lattice. More desirably, the rounded hexagonal holes are oriented at an angle of about 30° to the triangular lattice.

Although most of the optical power is transmitted in air in the photonic band gap fibers of the present invention, an appreciable amount of power (e.g., a few up to about 20%) propagates through the matrix material (28 in FIG. 1) of the fiber. As such, it is desirable to form the photonic band gap fiber from materials that are highly transparent to the desired ultraviolet wavelengths. The skilled artisan can adapt materials and processes used in the fabrication of materials for ultraviolet photolithography. Details of such materials and processes can be found in, for example, U.S. Pat. Nos. 5,616,159; 5,735,921; 6,205,818; 6,403,508; and 6,541,168; and U.S. patent application Ser. Nos. 09/967,398; and 10/326,200, each of which is hereby incorporated by reference in its entirety. Especially suitable materials have very low levels of alkali, alkaline earth, and transition metals. For example, for use with ultraviolet wavelengths down to about 193 nm, the matrix material of a photonic band gap fiber of the present can be a highly pure fused silica material, such as HPFS®, available from Corning Incorporated of Corning, N.Y. For ultraviolet wavelengths down to about 160 nm, a highly pure fused silica material having an OH concentration of less than about 500 ppm is desirable. More desirably, the material has an OH concentration of less than about 300 ppm for use with ultraviolet wavelengths down to about 160 nm. For ultraviolet wavelengths below about 160 nm (such as 157 nm), a highly pure fused silica material having an OH concentration of less than about 80 ppm, and a fluorine concentration of between about 0.1 wt % and about 4 wt %. More desirably, the material has an OH concentration of less than about 50 ppm, and a fluorine concentration of between about 0.7 wt % and about 2.5 wt % for use with ultraviolet wavelengths below about 160 nm. It is desirable that materials for use in the present invention have relatively low levels of chlorine (e.g. below 0.1 wt %, or even below 0.03 wt %). In certain desirable embodiments of the invention, the matrix material has a molecular oxygen concentration of below about $3 \times 10^{16}$ molecules/cm$^3$, below about $1 \times 10^{16}$ molecules/cm$^3$, or even below about $5 \times 10^{17}$ molecules/cm$^3$.

Figure 10:
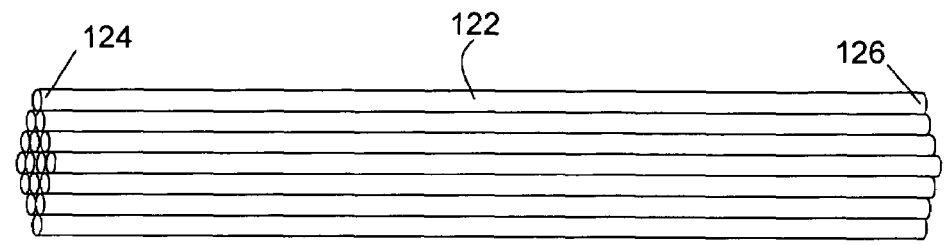
FIG. 10 is a schematic view of a method of transporting short wavelength radiation using a bundle of photonic band gap fibers.

For some applications, a single photonic band gap fiber may not provide sufficient power or a large enough area of illumination. It may be desirable to use a plurality of photonic band gap fibers to transport short wavelength radiation. As will be described below, the use of a plurality of photonic band gap fibers can provide a number of advantages. An embodiment of the invention using a plurality of photonic band gap fibers to transport short wavelength radiation is shown in FIG. 10. A bundle 120 of photonic band gap fibers 122 is provided. As described above, each photonic band gap fiber includes a core region and a photonic band gap structure surrounding the core region, and has an input end 124 and an output end 126. While the bundle 120 is shown in FIG. 10 as having a parallelepiped shape, the skilled artisan will recognize that the bundle may have any desired arrangement (e.g., round, oblong, linear, triangular). Short wavelength radiation 128 is coupled into the input ends of the photonic band gap fibers, and coupled out of the output ends of the photonic band gap fibers.

Figure 11:
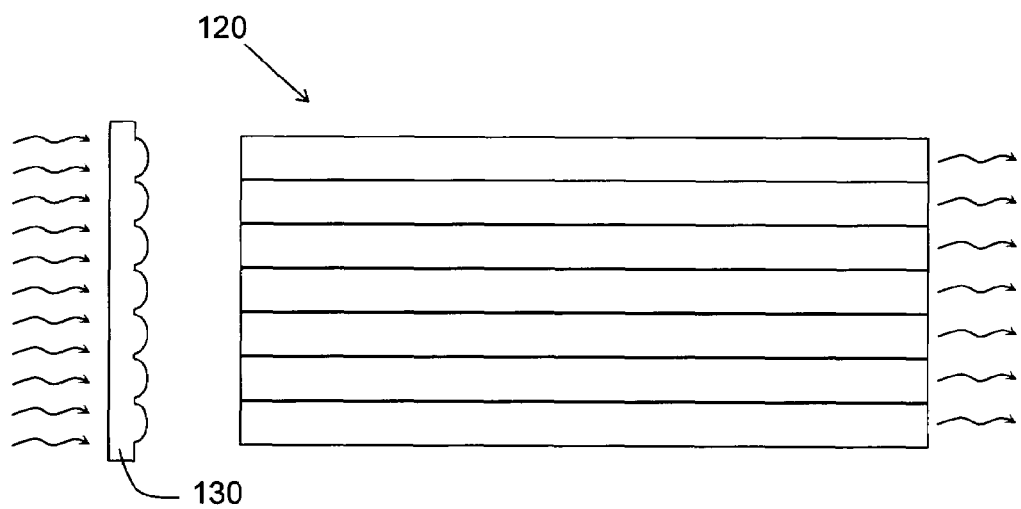
FIG. 11 is a schematic view of a method of transporting short wavelength radiation using a lens array and a bundle of photonic band gap fibers.

As shown in side view in FIG. 11, a lens array 130 may be used to couple the short wavelength radiation into the input ends of the photonic band gap fibers. The lens array may be a molded array of lenses, as shown, or may be, for example, an array of GRIN collimators, as would be apparent to the skilled artisan. The lens array is desirably designed to capture a high fraction of the short wavelength radiation emitted by an short wavelength source. Lens arrays may likewise be used to couple radiation out of the output ends of the photonic band gap fibers.

Figure 12:
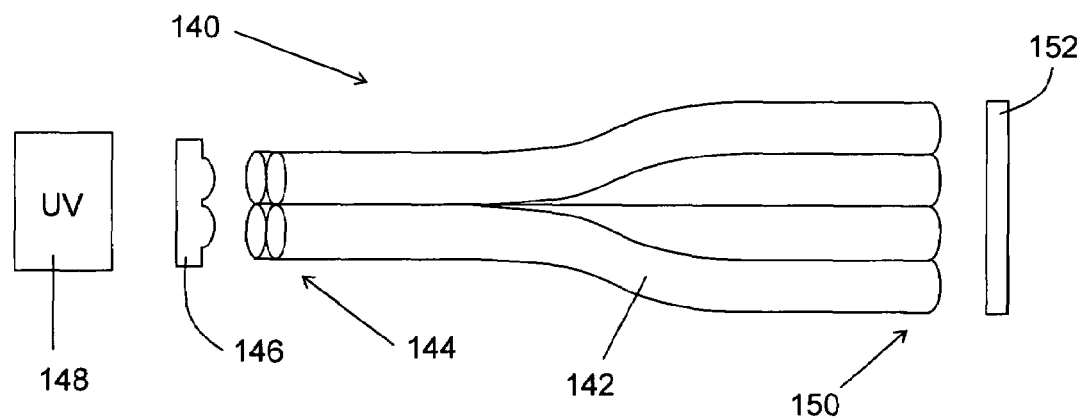
FIG. 12 is a schematic view of a bundle of photonic band gap fibers that is reshaped between its input and output.

The bundle of photonic band gap fibers may be reshaped in between the input ends of the fibers and the output ends of the fibers. The arrangement of the bundle at the input end can be shaped to match the short wavelength source, while the arrangement at the output end can be shaped to match a workpiece or an optical system, or to meet the requirements of an instrument or process. In the example shown in schematic view in FIG. 12, bundle 140 includes four photonic band gap fibers 142. At the input end 144 of the bundle, the photonic band gap fibers are arranged in a first arrangement. The first arrangement is a 2×2 square in order to match lens array 146, which couples short wavelength radiation from short wavelength source 148 into the input ends of photonic band gap fibers 142. At the output end 150 of the bundle, the fibers are arranged in a second arrangement. The second arrangement is a 4×1 column, configured to illuminate the long, narrow workpiece 152. In this embodiment of the invention, the first arrangement substantially differs from the second arrangement. For example, as shown in FIG. 12, the first arrangement may have a substantially different overall shape than the second arrangement.

Figure 13:
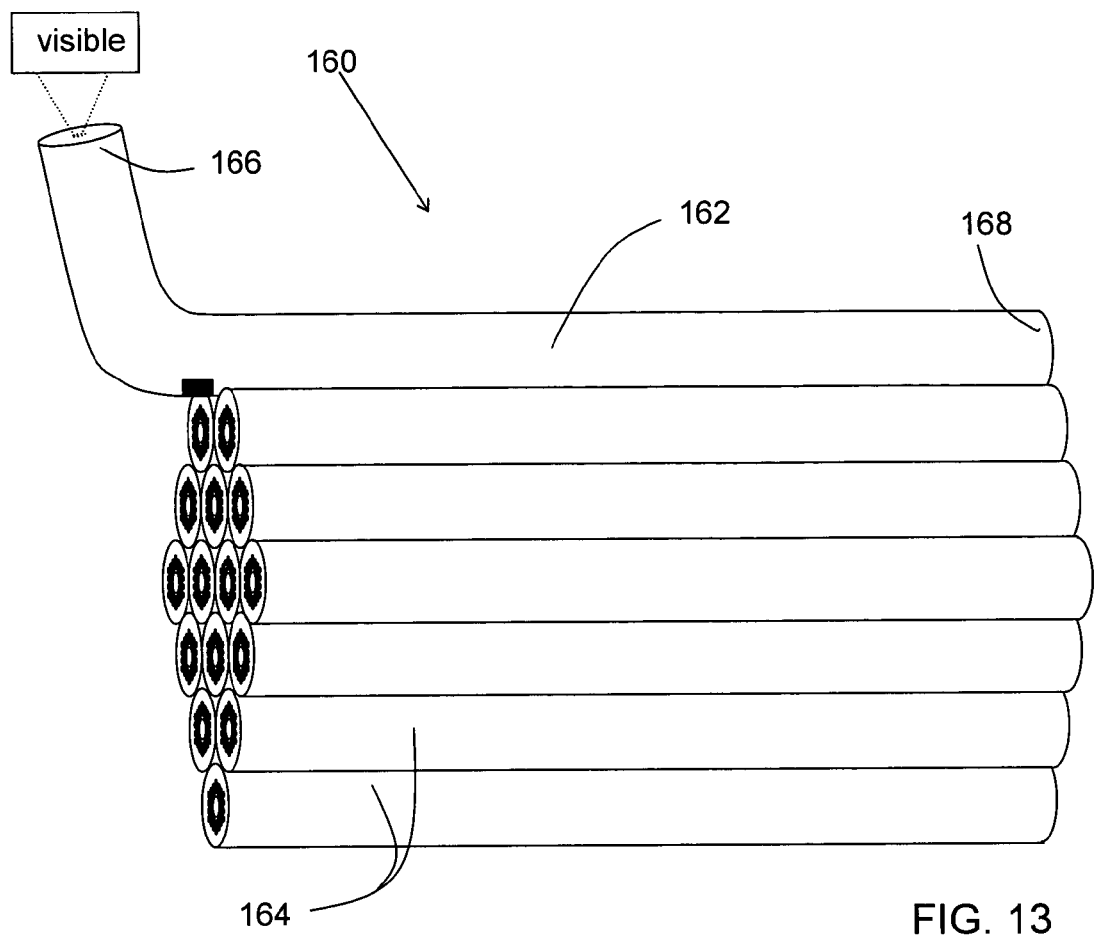
FIG. 13 is a schematic view of a bundle including photonic band gap fibers and a standard visible radiation-guiding optical fiber.

Standard visible radiation-guiding optical fibers can be used in the bundle to provide further functionality. For example, as shown in FIG. 13, a bundle 160 can include an optical fiber 162 adapted to guide visible radiation in addition to a plurality of photonic band gap fibers 164. Optical fiber 162 may be, for example, a conventional glass optical fiber; alternatively, it may be a photonic band gap fiber or a photonic crystal fiber. Optical fiber 162 has an input end 166 and an output end 168. Visible radiation is coupled from a visible source into input end 166 of optical fiber 162, and coupled out of its output end 168. As shown in FIG. 13, output end 166 of optical fiber 162 may desirably be arranged with the output ends of the photonic band gap fibers, so that the visible radiation emanating therefrom can be used as a guide in alignment of the whole bundle.

Figure 14:
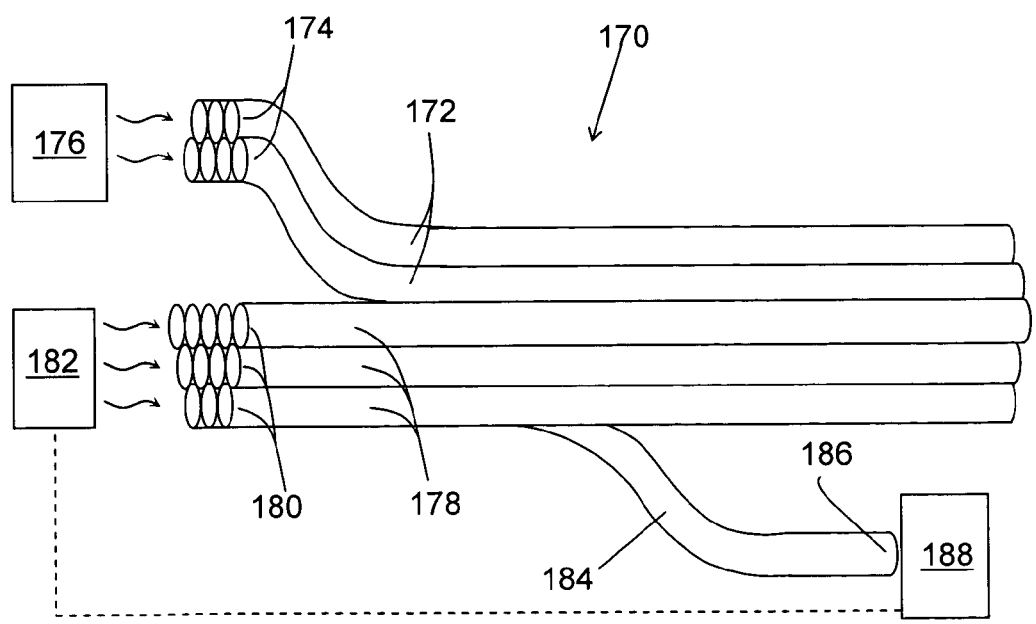
FIG. 14 is a schematic view of a furcated bundle of photonic band gap fibers.

The bundle of fibers may be furcated at the input end or at the output end to provide further functionality. For example, in FIG. 14, bundle 170 includes a plurality of photonic band gap fibers. A first set of photonic band gap fibers 172 have their input ends 174 coupled to a first short wavelength source 176, while a second set of photonic band gap fibers 178 have their input ends 180 coupled to a second short wavelength source 182. The bundle may likewise be furcated at the output end to provide short wavelength radiation to a plurality of instruments, processes, or workpieces. In certain embodiments of the invention, one or more of the photonic band gap fibers may have their output ends coupled to a feedback detector. For example, in FIG. 14, photonic band gap fiber 184 has its output end 186 coupled to feedback detector 188, which provides feedback control of first short wavelength source 182.

In some embodiments of the invention, it may be desirable for the photonic band gap fibers of the bundle to not be of substantially uniform length. For example, transmitting pulsed short wavelength radiation, using photonic band gap fibers of substantially different length will serve to increase the effective length pulses emitted from the output of the bundle. Use of different lengths of fiber can also reduce the overall coherence of the transmitted short wavelength radiation. The coherence of the transmitted radiation may be further reduced by moving (e.g., vibrating or 'jiggling') one or more of the photonic band gap fibers during the transmission of the short wavelength radiation.

Another embodiment of the present invention relates to the generation of short ultraviolet radiation using a photonic band gap fiber. High-harmonic generation has been used to generate coherent light in the ultraviolet and extreme ultraviolet regions of the spectrum. In high-harmonic generation, pulses of short wavelength radiation with extremely short duration can be produced by focusing a high intensity femtosecond pump laser into a gas. The atoms in the gas radiate harmonics of the incident frequency in the process of interacting with the intense ultrashort pulse laser. The highly nonlinear nature of the ionization process makes it possible to generate harmonics up to order 299 and higher at wavelengths below 3nm. Conventional high-harmonic generation techniques are described in, for example, Durfee III et al., "Ultrabroadband phase-matched optical parametric generation in the ultraviolet by use of guided waves" *Opt. Lett.*, 22(20), 1565 (1997); Rundquist et al., "Phase-Matched Generation of Coherent Soft X-rays," *Science*, 250, 1412 (1998); Durfee III et al., "Phase Matching of High-Order Harmonics in Hollow Waveguides," *Phys. Rev. Lett.*, 83(11), 2187 (1999); Misoguti et al., "Generation of Broadband VUV Light Using Third-Order Cascaded Processes," *Phys. Rev. Lett.*, 87(1), 013601-1 (2001); and Bartels et al., "Generation of Spatially Coherent Light at Extreme Ultraviolet Wavelengths," *Science*, 297, 376 (2002), each of which is hereby incorporated herein by reference in its entirety.

Figure 15:
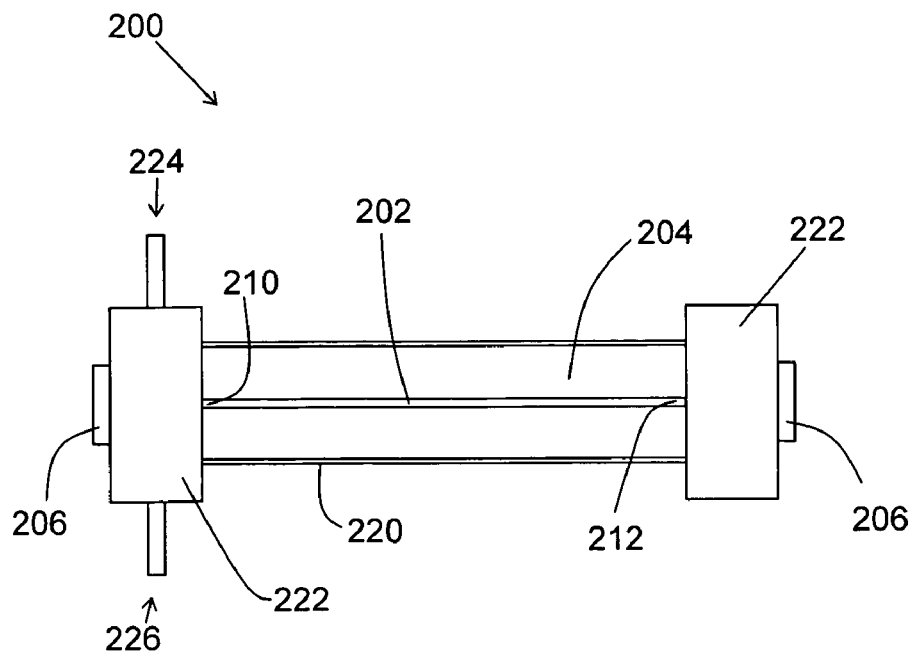
FIG. 15 is a schematic view of a method of generating ultraviolet radiation according to one embodiment of the present invention.

A method of generating ultraviolet radiation and an apparatus suitable for use therein are illustrated in schematic view in FIG. 15. According to one embodiment of the invention, a method of generating ultraviolet radiation includes the step of providing a photonic band gap fiber 202 having a hollow core region and a photonic band gap structure surrounding the hollow core region. The hollow core region contains a gas at a pressure. In a desirable embodiment of the invention, the gas is a noble gas. The gas pressure could be a low pressure (i.e., below atmospheric pressure) or a high pressure (i.e., at or above atmospheric pressure). In the method according to this embodiment of the invention, pulsed coherent pump radiation is coupled into the hollow core of the photonic band gap fiber. The photonic band gap fiber is desirably adapted to guide the pump radiation. As used herein, ultraviolet radiation is radiation having a wavelength below 400 nm, while pump radiation is radiation having a wavelength above 400 nm. Especially suitable pump radiation sources provide pump radiation having a wavelength between about 600 nm and about 1000 nm. In the hollow core of the photonic band gap fiber, the pump radiation is guided, and interacts with the gas, generating ultraviolet radiation, which emerges from the photonic band gap fiber along with any unconverted pump radiation.

Apparatus 200 of FIG. 15 is a suitable apparatus for use in conjunction with the methods of the present invention. Apparatus 200 includes a pressure chamber 204 having at least one window 206. The windows 206 are desirably substantially transparent (e.g., >50% transmission) to both the pump radiation used for excitation and the generated ultraviolet radiation. Pressure chamber 204 is desirably able to withstand both low (e.g., down to 1 mTorr) and high (e.g., up to 10 atmospheres) pressures. In the apparatus shown in FIG. 15, pressure chamber 204 is formed from a glass tube 220 held between stainless steel flanges 222. In certain embodiments of the invention, the pressure chamber also includes ports that are in fluid communication with the interior of the pressure chamber. For example, pressure chamber 204 of FIG. 15 has a vacuum port 224 and a gas purge port 226.

Photonic band gap fiber 202 has an input end 210 and an output end 212, each of which is operatively coupled to one of the at least one windows 206. In the embodiment of the invention shown in FIG. 15, the apparatus has two windows 206, and input end 210 of photonic band gap fiber 202 is operatively coupled to one window, while output end 212 is operatively coupled to the other window. Photonic band gap fiber 202 is adapted to guide the pump radiation used for excitation. In certain embodiments of the invention, photonic band gap fiber 202 also guides the ultraviolet radiation generated by interaction of the pump radiation with the gas contained within the hollow core of the photonic band gap fiber. For example, the pump radiation may be guided by a fundamental band gap of the photonic band gap structure, while the ultraviolet radiation is guided by a higher-order band gap of the photonic band gap structure. In certain embodiments of the invention having a photonic band gap fiber adapted to guide both the pump radiation and the ultraviolet radiation, the photonic band gap fiber may double back on itself, with both the input and output ends of the photonic band gap fiber being coupled through a common window.

Figure 16:
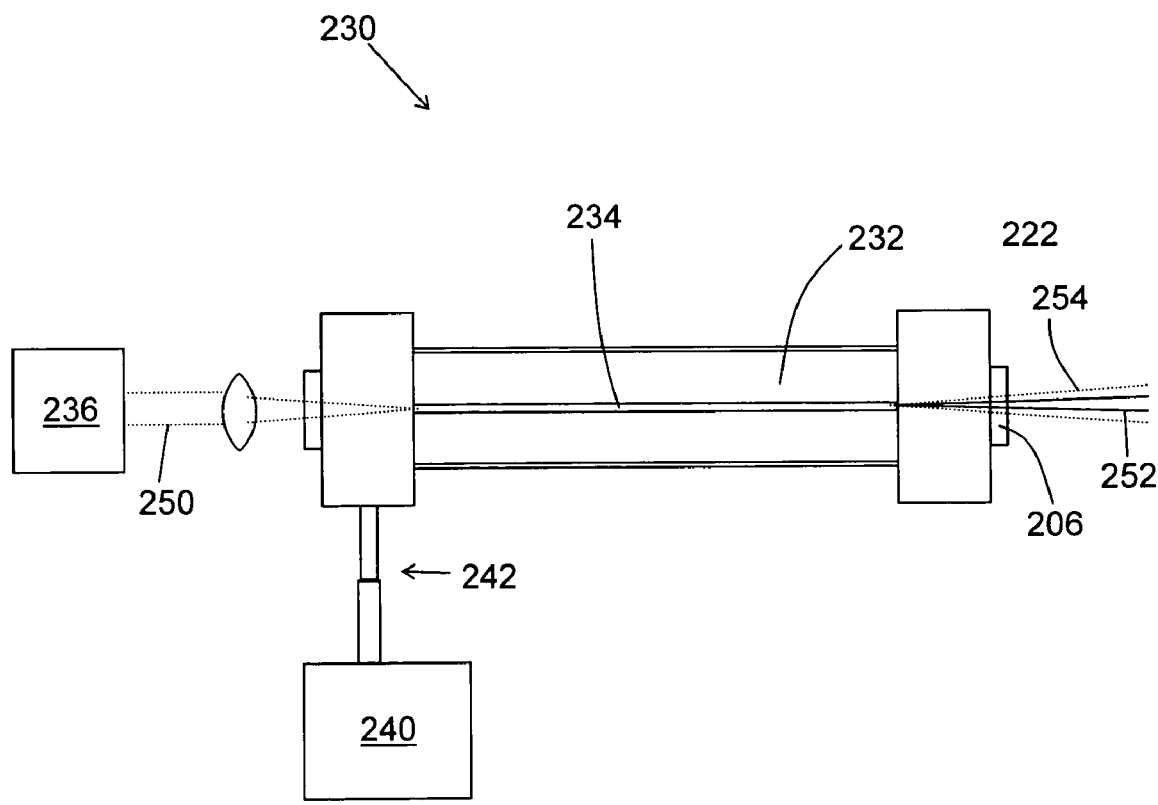
FIG. 16 is a schematic diagram of an apparatus for generating ultraviolet radiation according to one embodiment of the present invention.

Desirably, the apparatus includes a source of pulsed coherent pump radiation. As shown in FIG. 16, apparatus 230 includes a pressure chamber 232 and a photonic band gap fiber 234, substantially as described above. Apparatus 230 also includes a femtosecond laser source 236 operating at a wavelength of about 800 nm. An example of a suitable laser source for use in the present invention is a Hurricane model laser, available from Positive Light. Femtosecond laser source 236 is operatively coupled to the input end of photonic band gap fiber 234 through lens 238. As will be described more fully below, it may be desirable for the skilled artisan to be able to adjust the pressure of noble gas in the pressure chamber. As such, the apparatus may include a pressure control device coupled to the interior of the pressure chamber. As shown in FIG. 16, apparatus 230 includes pressure control device 240 coupled to port 242 of pressure chamber 232. Pressure control device 240 is adapted to provide the interior of the pressure chamber with a desired pressure of noble gas. In use, the apparatus of FIG. 16 can be used to convert pump radiation 250 from femtosecond laser source 236 to ultraviolet radiation 252. A filter (not shown) can be used to remove any unconverted pump radiation.

Figure 17:
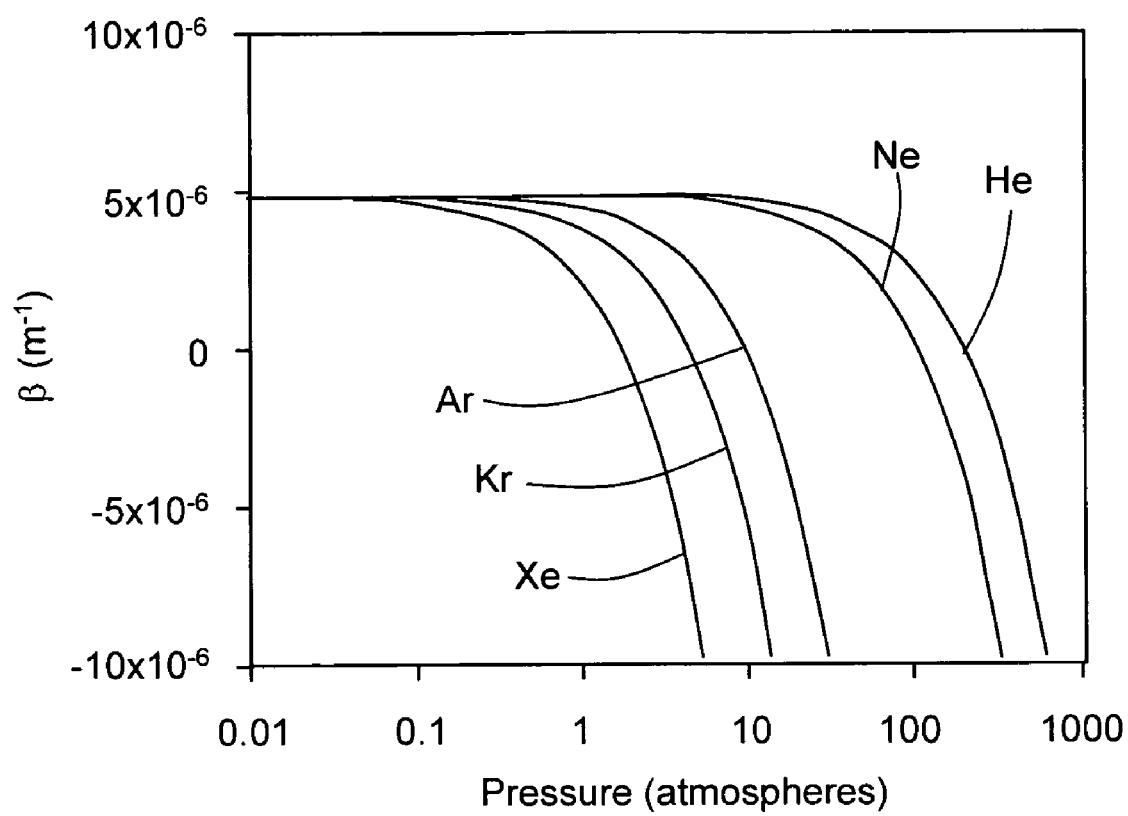
FIG. 17 is a graph of $\Delta\beta$ vs. gas pressure for various noble gases.

The specific harmonic (and therefore the wavelength of the ultraviolet radiation) generated in the high-harmonic generation processes used in the present invention depends on the conversion efficiency with respect to the specific harmonic. Maximum efficiency is achieved when the propagation constants of the fundamental wave (i.e. the pump radiation) and the harmonic (i.e. the ultraviolet radiation) are matched. Matching of the propagation constants allows the waves to travel through the gas at the same velocity, thereby maximizing the interaction between the fundamental wave and the harmonic. To achieve the desired phase matching condition, the waveguide dispersion may be balanced by the material dispersion of the gas inside the hollow core of the photonic band gap fiber. The skilled artisan may adjust the overall material dispersion of the gas by adjusting its pressure. FIG. 17 is a graph of the calculated difference between the fundamental and harmonic propagation constants ($\Delta\beta$) vs. gas pressure for a variety of noble gases. The fundamental wavelength is 800 nm, and the harmonic used is the third harmonic at 267 nm. The photonic band gap fiber was modeled in the calculations as a perfectly reflecting hollow cylinder 10 μm in diameter. The skilled artisan will note that the pressures at which $\Delta\beta=0$ vary from a few atmospheres (for xenon) to a few hundred atmospheres (for helium). The graph of FIG. 17 suggests that the skilled artisan may adjust the pressure of the gas in the pressure chamber to achieve phase matching between the pump radiation and the ultraviolet radiation, thereby maximizing the generation of a desired harmonic. In the methods and apparati of the present invention used in high harmonic generation, the pressure of gas in the pressure chamber is desirably greater than 0.1 atmospheres, and more desirably more than 0.5 atmospheres. It may be desirable for the pressure of the noble gas in the pressure chamber multiplied by the atomic number of the noble gas to be greater than about 20 atmospheres.

Conventional guided high-harmonic generation techniques, such as those described in the Durfee III et al. articles described above, use a hollow capillary tube 100-150 μm in diameter to guide the pump radiation using grazing incidence guidance. The use of a photonic band gap fiber to guide the pump radiation as described herein provides distinct advantages over the conventional use of hollow capillaries. First, the efficiency of the nonlinear processes used in high harmonic generation is strongly dependent on the intensity of the pump radiation. The 100-150 μm diameter hollow capillaries provide guide the pump radiation with a relatively low intensity. Simply using smaller capillaries is not practical, as the loss of the grazing incidence guidance is proportional to the cube of the capillary diameter. The use of a photonic band gap fiber allows a hollow core as small as 10 μm (or even smaller) to be used, increasing the intensity of the pump radiation by at least about a factor of 100. The phase matching pressure for a given gas is also greatly increased by the use of a smaller waveguide; for example, the phase matching pressure for helium in a 150 μm diameter capillary is about 2 atmospheres, while in a 10 μm hollow core photonic band gap waveguide, it is about 200 atmospheres. The increased gas pressure results in a greatly increased efficiency of the nonlinear high harmonic generation processes. Further, the photonic band gap fiber may guide the pump radiation with substantially less loss than would a hollow capillary using a grazing incidence mechanism, increasing the interaction length between fundamental and harmonic and thereby even further increasing generation efficiency. Advantageously, the increase in efficiency will allow the skilled artisan to generate more ultraviolet radiation with a given pump radiation source, or will relax the power requirements for the pump source.

The high-harmonic generation methods of the present invention may be used by the skilled artisan to generate ultraviolet radiation in a variety of wavelength ranges. For example, the high-harmonic methods may be used to generate longwave ultraviolet radiation (i.e., UVA), midrange ultraviolet radiation (i.e., UVB), shortwave ultraviolet radiation (i.e., UVC), extreme ultraviolet radiation, vacuum ultraviolet radiation, or soft x-ray radiation.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of transporting short wavelength radiation, the method comprising the steps of
    providing a photonic band gap fiber, the photonic band gap fiber comprising a core region and a photonic band gap structure surrounding the core region, the photonic band gap fiber having an input end and an output end, the photonic band gap structure comprising a triangular lattice of holes formed in a matrix material, the holes being defined by triangular islands of glass joined at their apices;
    coupling the short wavelength radiation into the input end of the photonic band gap fiber; and
    coupling the short wavelength radiation out of the output end of the photonic band gap fiber.

2. The method of claim 1 wherein the short wavelength radiation has a wavelength selected from the group consisting of about 157 nm, about 193 nm, about 244 nm, about 248 nm, about 266 nm, about 351 nm, about 355 nm, and about 532 nm.

3. The method of claim 1 wherein the short wavelength radiation is ultraviolet radiation having a wavelength less than 400 nm.

4. The method of claim 1 wherein the core region of the photonic band gap fiber is a hollow core region.

5. The method of claim 4 wherein the short wavelength radiation is guided substantially within the hollow core region.

6. The method of claim 1 wherein the short wavelength radiation is confined in the core region of the photonic band gap fiber by a fundamental band gap of the photonic band gap structure.

7. The method of claim 1 wherein the short wavelength radiation is confined in the core region of the photonic band gap fiber by a higher-order band gap of the photonic band gap structure.

8. The method of claim 1 wherein greater than 60% of the volume of the photonic band gap structure is filled with gas or a vacuum.

9. The method of claim 1, wherein the short wavelength radiation has an average power greater than 800 mW.

10. The method of claim 1, wherein the holes formed in the matrix material are rounded hexagonal holes.

11. The method of claim 10, wherein the rounded hexagonal holes have diameters of curvature of less than about $0.5 \cdot \Lambda$, where $\Lambda$ is a pitch of the triangular lattice.

12. The method of claim 10, wherein the rounded hexagonal holes are oriented at an angle of at least about 20 degrees to the triangular lattice.

13. The method of claim 1, wherein the matrix material comprises highly pure fused silica.

14. The method of claim 13, wherein the matrix material has an OH concentration less than about 500 ppm.

15. The method of claim 13, wherein the matrix material has an OH concentration of less than about 80 ppm, and a fluorine concentration of between about 0.1 wt % and about 4 wt %.

16. A method of transporting short wavelength radiation, the method comprising the steps of
providing a bundle including a plurality of photonic band gap fibers, each of the photonic band gap fibers comprising a core region and a photonic band gap structure surrounding the core region, each of the photonic band gap fibers having an input end and an output end, each photonic band gap structure comprising a triangular lattice of holes formed in a matrix material, the holes being defined by triangular islands of glass joined at their apices;
coupling the short wavelength radiation into the input ends of the photonic band gap fibers; and
receiving the short wavelength radiation out of the output ends of the photonic band gap fibers.

17. The method of claim 16 wherein the input ends of the photonic band gap fibers are operatively coupled to a lens array, and wherein the short wavelength radiation is coupled into the photonic band gap fibers by the lens array.

18. The method of claim 16 wherein the input ends of the photonic band gap fibers are arranged in a first arrangement, and the output ends of the photonic band gap fibers are arranged in a second arrangement, and the first arrangement substantially differs from the second arrangement.

19. The method of claim 16, wherein the output end of one of the photonic band gap fibers is coupled to a feedback detector.

20. The method of claim 16, wherein the bundle further comprises an optical fiber adapted to guide visible radiation, the optical fiber including an input end and an output end, and wherein the method includes the steps of
coupling visible radiation into the input end of the optical fiber; and
coupling the visible radiation out of the output end of the optical fiber.

21. A method of transporting short wavelength radiation, the method comprising the steps of
providing a bundle including a plurality of photonic band gap fibers, each of the photonic band gap fibers comprising a core region and a photonic band gap structure surrounding the core region, each of the photonic band gap fibers having an input end and an output end;
coupling the short wavelength radiation into the input ends of the photonic band gap fibers; and
receiving the short wavelength radiation out of the output ends of the photonic band gap fibers;
wherein the plurality of photonic band gap fibers includes a first set of photonic band gap fibers, and a second set of photonic band gap fibers, and wherein input ends of the first set of photonic band gap fibers are coupled to a first short wavelength source, and the input ends of the second set of photonic band gap fibers is coupled to a second short wavelength source.

22. The method of claim 16, wherein the plurality of photonic band gap fibers are not of substantially uniform length.

23. The method of claim 16, wherein the method further comprises the step of moving an interior portion of at least one of the photonic band gap fibers while short wavelength radiation is being guided therein.

* * * * *